US010882538B1

(12) United States Patent
Witt et al.

(10) Patent No.: US 10,882,538 B1
(45) Date of Patent: Jan. 5, 2021

(54) SYSTEM AND METHOD FOR A COMBINED VISUAL AND AUDIBLE SPATIAL WARNING SYSTEM

(71) Applicant: KARMA AUTOMOTIVE LLC, Irvine, CA (US)

(72) Inventors: David Joseph Witt, Newport Beach, CA (US); Michael Groene, Irvine, CA (US); Andre Franco Luis, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 16/527,984

(22) Filed: Jul. 31, 2019

(51) Int. Cl.

| | |
|---|---|
| ***B60W 50/14*** | (2020.01) |
| ***B60R 21/0136*** | (2006.01) |
| ***G01S 13/931*** | (2020.01) |
| ***B60R 21/013*** | (2006.01) |
| ***G08G 1/16*** | (2006.01) |

(52) U.S. Cl.
CPC ............ *B60W 50/14* (2013.01); *G08G 1/166* (2013.01); *B60W 2050/143* (2013.01); *B60W 2050/146* (2013.01); *B60W 2554/00* (2020.02)

(58) Field of Classification Search
CPC ...................................................... G08G 1/167
See application file for complete search history.

(56) References Cited

U.S. PATENT DOCUMENTS

| | | | | |
|---|---|---|---|---|
| 2017/0084174 | A1* | 3/2017 | Suzuki | B60W 30/00 |
| 2018/0005528 | A1* | 1/2018 | Loeillet | G08G 1/165 |
| 2018/0086339 | A1* | 3/2018 | Hanna | G06K 9/00845 |
| 2018/0164404 | A1* | 6/2018 | Koga | G06F 1/1694 |
| 2020/0062228 | A1* | 2/2020 | Nakabayashi | B60T 8/172 |

* cited by examiner

*Primary Examiner* — Joseph H Feild
*Assistant Examiner* — Pameshanand Mahase
(74) *Attorney, Agent, or Firm* — Gordon Rees Scully Mansukhani, LLP

(57) ABSTRACT

A driver alert system is configured to provide combined visual and audible spatial warnings. The system can include an object detection system to provide the location of at least one object relative to a vehicle, an audible output system including a plurality of speaker units, and a display unit. A control unit of the system can determine location of objects and generate combined visual and audible spatial warnings. Output of the combined visual and audible spatial warning can be controlled to output an audible alert indicating the location of the object relative to the vehicle passenger, and control a display unit to present a particle display output indicating the location of the object relative to the vehicle passenger. The system may include processes for control of combined visual and audible spatial warnings to account for changes in object position and vehicle heading.

16 Claims, 6 Drawing Sheets

SYSTEM AND METHOD FOR A COMBINED VISUAL AND AUDIBLE SPATIAL WARNING SYSTEM

BACKGROUND

The present disclosure relates to systems and methods for providing driver alerts in a vehicle and enhanced driver alerts by way of spatialized audio and visual elements.

Vehicle systems provide driver feedback in various ways. Conventional vehicle configurations often include instrument panels. These existing systems typically provide a single form of feedback, usually with activation of a lighted element (e.g., check engine light) or a display of text. These conventional messages are typically limited to operating conditions of the vehicle or vehicle components. While conventional configurations allow for warnings to be displayed visually or by activation of a lighted element, these warnings are limited in the information to a drive and require the driver to see the warning light. There exists a need for detection and control of outputs that provides additional information for drivers and vehicle passengers.

SUMMARY

Disclosed and claimed herein are systems, methods, and configurations for combined visual and audible spatial warnings. In one embodiment, a driver alert system includes an object detection system configured to provide the location of at least one object relative to the vehicle, an audible output system including a plurality of speaker units, and a display unit. The control unit is coupled to the object detection system, audible output system and display unit and configured to determine location of the at least one object relative to a vehicle passenger position, and generate a combined visual and audible spatial warning. The control unit is also configured to control output of the combined visual and audible spatial warning, wherein the audible output system is controlled to output an audible alert indicating the location of the object relative to the vehicle passenger, and wherein the display unit is controlled to present a particle display output indicating the location of the object relative to the vehicle passenger.

In one embodiment, the location of the at least one object relative to a vehicle passenger position is determined to identify angular position and distance relative to the vehicle passenger position.

In one embodiment, the visual warning is a particle display including a focus point presented to identify the object position and one or more particle elements determined for the object, the particle display presented by the display unit.

In one embodiment, the visual warning includes adding particle display elements to a display element presented by the display unit.

In one embodiment, the visual warning includes at least one of a lighted display and lighted warning by a display element of a speaker unit of the audible output system.

In one embodiment, the audio warning includes at least one of a sound and an alert generated by a speaker unit associated with the location of the object.

In one embodiment, the audio warning is output by controlling operation of at least one speaker unit to direct sound output in coordination with display of the visual warning.

In one embodiment, the combined visual and audible spatial warning is generated based on a category of the object.

In one embodiment, the control unit is configured to update the output of the combined visual and audible spatial warning based on changes in object position.

In one embodiment, the control unit is configured to update the output of the combined visual and audible spatial warning based on changes in direction of the vehicle relative to the object.

Another embodiment is directed to a method for combined visual and audible spatial warnings by a driver alert system. The method includes determining, by a control unit, location of the at least one object relative to a vehicle passenger position, and generating, by the control unit, a combined visual and audible spatial warning. The method also includes controlling, by the control unit, output of the combined visual and audible spatial warning, wherein an audible output system is controlled to output an audible alert indicating the location of the object relative to the vehicle passenger, and wherein a display unit is controlled to present a particle display output indicating the location of the object relative to the vehicle passenger.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION

One aspect of the disclosure is directed to providing enhanced vehicle alerts. Systems and processes are described herein that are configured for combined visual and audio warnings. In one embodiment, one or more vehicle components are controlled for spatial output of alerts. Spatial output may relate one or more indications by vehicle elements to communicate position of an object. In contrast to a lighted indicator that is either on or off, spatial output may provide an indication of presence and provide an indication of the objects position relative to the vehicle. In one embodiment, spatial output of alerts can include a combine of visual outputs, such as particle animations, with spatial audio output to provide indications for vehicle warning. Spatialized audio and visual alerts may enable faster and more accurate response by vehicle operators.

According to one embodiment, audio and visual alerts are combined to provide reinforcement by combining multiple modes of sensory perception. Combination of alerts may include control and updating of alerts based on detection and tacking of objects and hazards relative to a vehicle. In contrast to output of an alert from merely an off state to an on state, alerts as described herein are enhanced to provide spatial multi-dimension warnings that provide an indication of a directional alert to hazard location. In one embodiment, spatial Particle animations are controlled for output by one or more vehicle elements to provide visual alerts and directional cues to hazard location. Alerts may be configured to provide a spatial indication a user can perceive at least one of a direction (e.g., Left/Right, Front/Back, Up/Down) proximity and type of hazard. As a result, responses and control commands may be responded to faster and more accurately.

As used herein, the terms “a” or “an” shall mean one or more than one. The term “plurality” shall mean two or more than two. The term “another” is defined as a second or more. The terms “including” and/or “having” are open ended (e.g., comprising). The term “or” as used herein is to be interpreted as inclusive or meaning any one or any combination. Therefore, “A, B or C” means “any of the following: A; B; C; A and B; A and C; B and C; A, B and C”. An exception to this definition will occur only when a combination of elements, functions, steps or acts are in some way inherently mutually exclusive.

Reference throughout this document to “one embodiment,” “certain embodiments,” “an embodiment,” or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Figure 1:
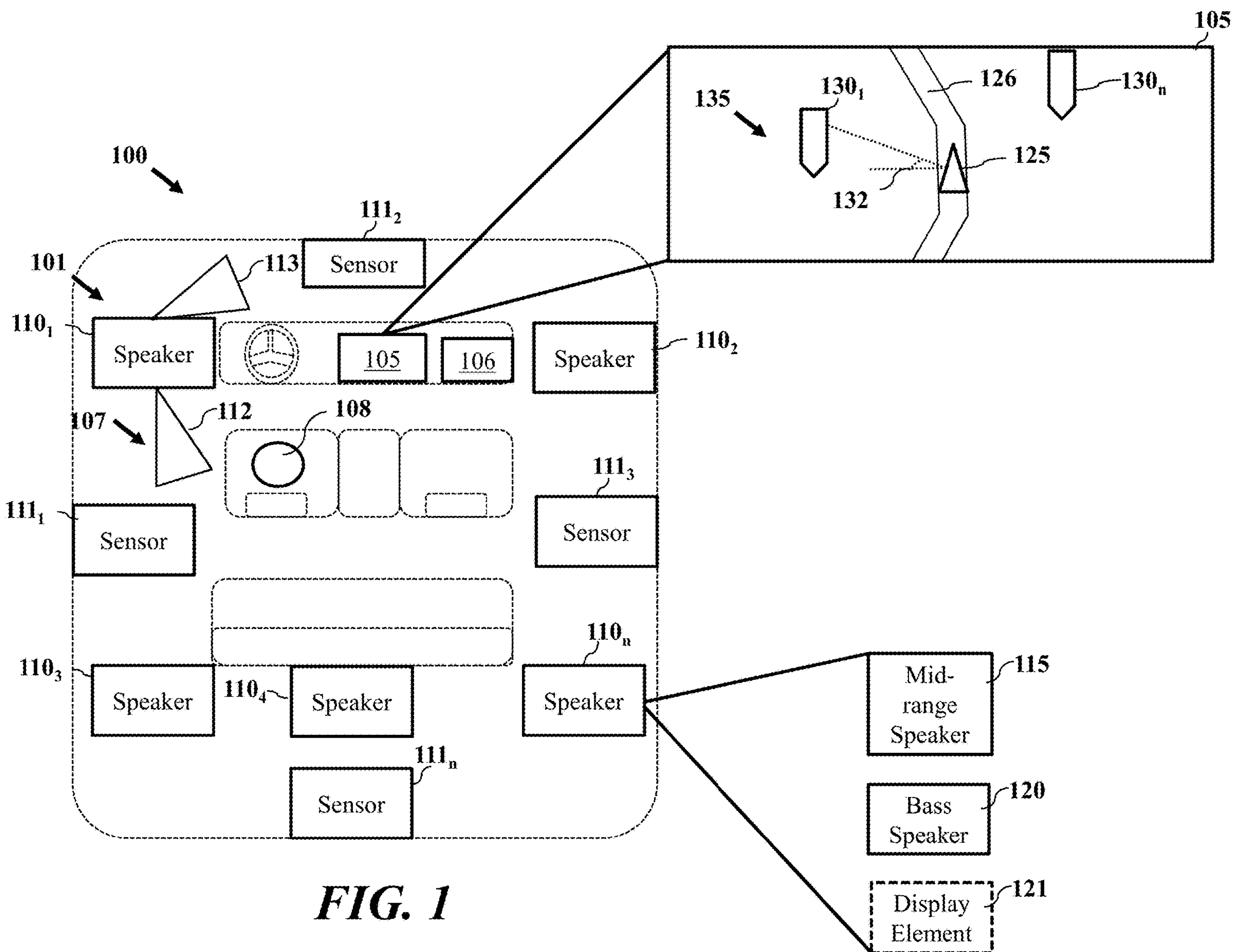
FIG. 1 depicts a graphical representation of a vehicle configuration including a warning system according to one or more embodiments.

Referring now to the figures, FIG. 1 depicts a graphical representation of a system according to one or more embodiments. System 100 may relate to a vehicle configuration including a warning system according to one or more embodiments. In one embodiment, system 100 is configured to provide for combined visual and audible spatial warnings. In certain embodiments, system 100 may be configured for vehicles as a driver or passenger alert system. System 100 includes one or more elements configured to provide the location of at least one object relative to vehicle 101.

System 100 includes display unit 105, an audible output system including a plurality of speaker units 110$_{1-n}$, and control unit shown as controller 106. In one embodiment, controller 106 is coupled to an object detection system having a plurality of sensors, such as sensors 111$_{1-n}$, the audible output system, and display unit 105. Controller 106 may be configured to determine location of the at least one object relative to a vehicle passenger position 108, and generate a combined visual and audible spatial warning.

According to one embodiment, system 100 is a vehicle system and is shown relative to a cabin of vehicle 101. According to one embodiment, speaker units 110$_{1-n}$ may be associated with one or more passenger locations, such as a driver sider front, driver side rear, passenger side front, passenger side rear and rear center. In addition, sensors 111$_{1-n}$ may be located in positions associated with vehicle front, rear, driver side and passenger side. In FIG. 1, a driver position 108 relates to an exemplary driver location for a left hand drive vehicle. According to one embodiment, one or more elements of system 100 and vehicle 101 may be controlled to provide an indication of an object relative to the vehicle for one or more positions. In certain embodiments, elements may be controlled to provide an indication of object position, direction, distance and type relative to one or more positions position within the vehicle. As such, passenger position 108 may be a reference point within vehicle 101.

According to one embodiment, object detection by controller 106 can include identification of one or more objects relative to the vehicle, including other vehicles, pedestrians, barriers, roadway elements, etc. In one embodiment, alerts are generated based on objects detected by sensors 111$_{1-n}$. Sensors 111$_{1-n}$ may be configured to detect objects by one or more of optical imaging and proximity sensors (e.g., electromagnetic, ultrasonic sensing, etc.). As shown in FIG. 1, sensors 111$_{1-n}$ may each relate to one or more components configured to image and detect objects relative to vehicle 101. Sensors 111$_{1-n}$ may output one or more of presence and imaging data to controller 106. Controller 106 may be configured to detect one or more classes of objects including vehicles, pedestrians, barriers, hazards, and objects in general relative to vehicle 101. According to another embodiment, controller 106 may receive location information for one or more objects from a network source, such as a server roadway communication unit, and/or other vehicles.

According to one embodiment, controller 106 can determine and/or receive the location of the at least one object relative to a vehicle passenger position 108. Controller 106 can also identify an angular position and distance relative to the vehicle passenger position. One or more of a distance, angular position and a general position of an object may be used to generate combined alerts by system 100.

Speaker units 110$_{1-n}$ may be controlled by controller 106. According to one embodiment, speaker units 110$_{1-n}$ include one or more driver units to output sound, including for example, a mid-range speaker 115, and bass speaker 120. According to one embodiment, alerts may be output by one or more of mid-range speaker and bass speaker components of the speaker units. Speaker units 110$_{1-n}$ may be configured to output alerts in addition to sound output (e.g., music, notifications, etc.) by an infotainment/media player of vehicle 101.

According to one embodiment, each of the speaker units 110$_{1-n}$ may be configured to directionally output sound and alerts. For example, speaker units 110$_{1-n}$ may include a 3D tweeter configuration having one or more sound direction zones. According to exemplary embodiments, speaker units 110$_{1-n}$ may be configured to include multiple and/or direction sound outputs. By way of example, speaker unit speaker unit 110$_1$ is shown output zone 112 and output zone 113. According to one embodiment, speaker unit 110$_1$ may be controlled to output an alert to output zone 112 when an object is located on a first side (e.g., driver or left side) of vehicle 101. In addition, speaker unit 110$_1$ may be controlled to output an alert to output zone 113 when an object is located on a second side (e.g., passenger or right side) of vehicle 101. According to another embodiment, controller 106 may be configured to control speaker unit 110$_1$ may be controlled to output an alert to first to output zone 112 and then follow up with another alert to output zone 113. According to another embodiment, controller 106 may be configured to control output by speaker units 110$_{1-n}$ for multiple sound outputs for multiple positions of reference. By way of example, a driver in vehicle passenger position 108 may be output one set of sounds, while a passenger in another position may receive a different set of sound output by speaker units $110_{1-n}$. As will be described in more detail below with FIG. 2, processes for output of an alert can include updating the control of sound output for an alert. While speaker unit $110_1$ is described with respect to speaker zones 112 and 113, it should be appreciated that each speaker unit of vehicle 101 may be configured with one or more speaker zones.

According to one embodiment, speaker units $110_{1-n}$ may optionally include a display element 121. Optional display element 121 may include one or more lighted (e.g., LED, light bar, etc.) elements that may be controlled in addition with a speaker unit. In an exemplary embodiment, controller 106 may be configured to output an audio alarm to a speaker unit and control activation of one or more lighted elements of the activated speaker unit. Optional display element 121 may be controlled to present one or more of a color, illumination, illumination sequence (e.g., series of flashes, series of activations of one or more predetermined lengths, etc.). Activation of optional display element 121 may be combined with an audio alert of a speaker unit.

Display unit 105 may be configured to present one or more user interface features of vehicle 101. According to one embodiment, controller 106 may be configured to control display elements presented by display unit 105 to provide one or more alerts. Controller 106 may be configured to modify and/or introduce display elements to provide an alert of an object. According to one exemplary embodiment, a visual alert may relate to a particle display element added to or incorporated into the display output.

FIG. 1 shows an exemplary embodiment including a display presentation by display unit 105 for a navigation application. In FIG. 1, display unit 105 presents vehicle symbol 125 on roadway 126 and representations for objects $130_{1-n}$. According to one embodiment, objects $130_{1-n}$ may relate to hazards. According to another embodiment, objects $130_{1-n}$ may relate to points of interest. Display also presents a background 135. According to one embodiment, controller 106 may control presentation of display unit 105 to include one or more visual alerts added to any combination of elements including vehicle symbol 125, roadway 126, objects $130_{1-n}$ may relate to points of interest, and background 135 to provide an alert. According to one embodiment, the alert may provide an indication of the location of an object. By way of example, an alert may provide one or more of the direction, distance and threat level based on the object position. In addition, object position relative to vehicle 101, such as angular position 132, may be determined and used by controller to present alerts.

It should also be appreciated that display unit 105 may be configured to present one or more visual alerts for other applications, including a home screen configuration, media playback configuration, parking assistance, lane change assistance and vehicle operations in general.

According to one embodiment, display unit 105 may be controlled to present a particle display output indicating the location of the object relative to the vehicle passenger. In the context of a navigation application, the particle display may include the addition of particle display elements to one or more portions of the display area, including activation of a left side portion of a screen or left half of a screen for an object on the left side of vehicle 101. Similarly, major portions or sections of the display unit 105, such as top may be presented with a particle animation for an object in front of the vehicle. In addition to major areas, the visual alert may be presented to indicate object position, where a portion of a major section is presented with a particle animation and the importance and/or distance of the object may be communicated by size and/or particle display characteristics.

According to one embodiment, controller 106 is configured to control output of a combined visual and audible spatial warning. A combined visual and audible warning can include audible output by speaker units $110_{1-n}$ for one or more audible alerts indicating the location of the object relative to the vehicle passenger, such as vehicle passenger position 108. Audible alerts may be output in coordination with one or more visual warnings or alerts provided by display 105 and/or elements of system 100 including speaker units $110_{1-n}$ (having optional display element 121). In one embodiment, the combined visual and audible spatial warning is generated based on a category of the object. Categories for objects can include moving/movable objects such as pedestrians, other vehicles, and movable objects in general. Another category of object may relate to hazards or barriers, such as a wall, pole, curb, pot hole or fixed structure in general. Another category of objects may relate to map/navigation items such as points of interest and intersections where action is required. For hazards requiring immediate attention, the audible warning and visual output may impart a level of urgency, such as a red color for display and increased volume for the audible alert. For warnings associated with the presence of other vehicles in vicinity of vehicle 101, the warnings may be presented with an output level tailored to the indicate presence without generating a high level of alarm.

According to another embodiment, controller 106 is configured to update the output of the combined visual and audible spatial warning based on changes in object position. Based on objects moving relative to the vehicle, the vehicle changing its orientation, the warnings may be controlled to update the intended direction of an object. In one embodiment, the control unit is configured to update the output of the combined visual and audible spatial warning based on changes in direction of the vehicle relative to the object.

For example, an object detected in front of a vehicle that is now associated with a driver's side of the vehicle may result in the controller 106 updating output of one or more of the speaker units $110_{1-n}$ and display 105 to activate speakers and/or control display elements to indicate the change in position.

Figure 2:
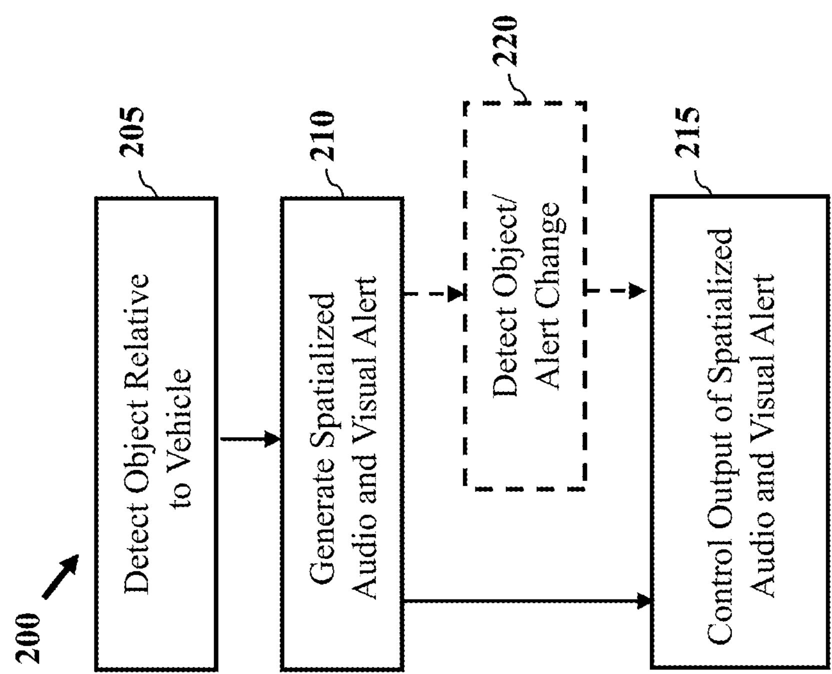
FIG. 2 depicts a process for a vehicle warning system according to one or more embodiments.

FIG. 2 depicts a process for a vehicle warning system according to one or more embodiments. Process 200 may be employed by system 100 of FIG. 1 for combined visual and audible spatial warnings according to one or more embodiments. In certain embodiments, process 200 may be performed by a control unit of a vehicle driver alert system.

Process 200 includes detecting an object at block 205. According to one embodiment, at least one object is detected relative to a vehicle. Object detection can include detection by sensors of the vehicle. In certain embodiments, object detection can be based on information received from one or more other devices. Locations of objects relative to a vehicle passenger position are determined, using angular position and distance relative to the vehicle passenger position, in order to provide spatial alerts. Multiple objects may be detected at block 205. In addition, block 205 can include monitoring object position to update spatial alerts based on the vehicle position, heading and operations.

At block 210, process 200 includes generating a spatialized audio and visual alert. Combined vehicle alerts may provide a warning to a vehicle operator of one or more hazards and may present spatial warnings to provide an indication or one or more of the hazard type and hazard position.

In one embodiment, a visual warning is a particle display including a focus point presented to identify the object position and one or more particle elements determined for the object. Particle displays may be presented by a portion of a display unit. For example, a control unit may add a particle display or animation to one or more already displayed elements, such as to a graphical user interface of the vehicle. In other embodiments, the particle displays may be presented on a portion of a display element, such as a border) or as part of lighted elements associated with the speaker units. In one embodiment, the visual warning includes adding particle display elements to a display element presented by the display unit. By way of example, in a navigation or parking assistance application, particle displays may be presented in areas of captured or displayed image data to show the position of a hazard.

In one embodiment, the visual warning includes at least one of a lighted display and lighted warning by a display element of a speaker unit of the audible output system. In certain embodiments, portions of lighted elements may be activated to provide an alert of an object.

In one embodiment, the audio warning includes at least one of a sound and an alert generated by a speaker unit associated with the location of the object. Alerts can include a tone output. In one embodiment the audio warning includes a tone output when an object is detected, wherein the tone is output by a speaker associated with the objects location. During regular driving, for example, the tone may be output by a speaker on the side of the vehicle (e.g., front, left side, right side, or back) associated with the objects location. Similarly, during a lane assist or parking operation, the sound may be output on a speaker on a side of the vehicle associated with a detected object. Output of audible alerts can include output of a tone at intervals of time. As such, an object may be detected and a tone may be generated at intervals of 3-5 seconds until the object is no longer hazard or in close proximity to the vehicle. In certain embodiments, the audio alert includes prerecorded voice to be output by a selected speaker unit. The prerecorded voice can include an identification of the object, such as "vehicle approaching driver side," or "approaching barrier" while performing a parking maneuver. These voice commands are merely examples. The audible alert can also include a voice output followed by one or more tones presented at intervals during detection of the object.

In one embodiment, the audio warning is output by controlling operation of at least one speaker unit to direct sound output in coordination with display of the visual warning. Coordination of the audible and visual alerts can include output of the audible alert while the visual alert is presented. At block 215, process 200 includes controlling output of the combined visual and audible spatial warning. The audible output system may be controlled to output an audible alert indicating the location of the object relative to the vehicle passenger, and a display unit may be controlled to present a particle display output indicating the location of the object relative to the vehicle passenger.

In one embodiment, the combined visual and audible spatial warning is generated based on a category of the object. By way of example, points of interest and/or navigation related intersections may be presented with at least one tone and display presentation. Hazards or vehicles in close proximity during driving may be presented with a second set of tones and display configuration. Alerts during parking or lane change may be output with a third set of tones and display characteristics. In one embodiment, a particle animation is superimposed to one or more display units to provide an indication of objects. The particle animation and changes to the particle animation may be coordinated with audible sound output, such that a tone output is synchronized with a display event including the addition or removal of a focus element, changes in background of the particle animation, etc. In one embodiment, the visual warning includes adding particle display elements to a display element presented by the display unit.

In one embodiment, the visual warning includes at least one of a lighted display and lighted warning by a display element of a speaker unit of the audible output system. Lighted display by the display element can include addition of accents or lighting features to the display background of an application. In other embodiments, portions of a display screen, irrespective of the display content can include a graphical element, such as an entire sliver of the left side or right corner.

In one embodiment, the audio warning includes at least one of a sound and an alert generated by a speaker unit associated with the location of the object. Speaker units of the vehicle may be configured to output media (e.g., radio, music, mobile device media, etc.). Accordingly, alerts may be mixed with sound output. In certain cases, alerts may be mixed over the sound output of the vehicle. In other embodiments the alerts may result in a control unit pausing media output for the alerts.

In one embodiment, the audio warning is output by controlling operation of at least one speaker unit to direct sound output in coordination with display of the visual warning. By way of example, output of a tone may coincide with a flash or change in a particle animation of the display unit.

Process 200 may optionally include detecting object and/or alert changes at block 220. A control unit may be configured to update the output of the combined visual and audible spatial warning based on changes in object position such that different speaker units and different portions of a display unit are controlled to present alerts. The control unit may also be configured to update the output of the combined visual and audible spatial warning based on changes in direction of the vehicle. During vehicle maneuvers, a hazard or object that is still present may be a basis for continued to alerts. In other embodiments, one or more of the audile and visual alerts may be changed when the vehicle changes direction. By way of example a barrier that is present when a vehicle is in drive or in park will be alerted to the driver in a more enhanced manner when the vehicle is placed in reverse.

Figure 3:
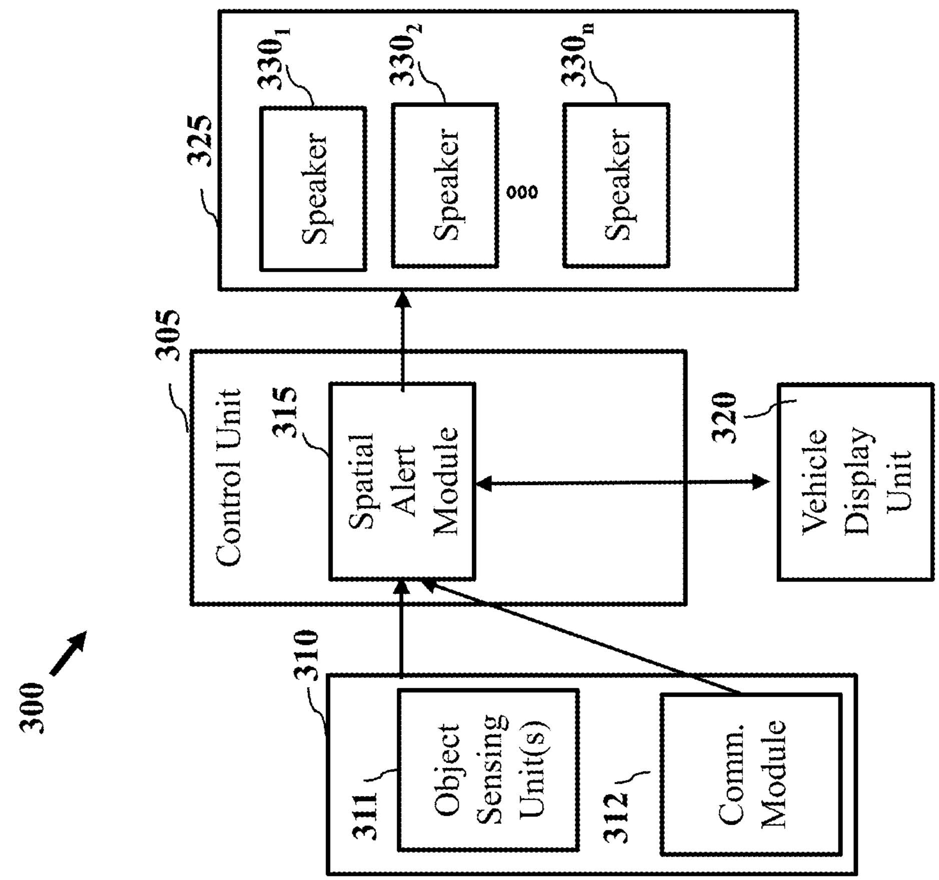
FIG. 3 depicts a graphical representation of a vehicle configuration according to one or more embodiments.

FIG. 3 depicts a graphical representation of a vehicle configuration according to one or more embodiments. Vehicle system 300 includes one or more elements configured to be employed in a vehicle. Vehicle system 300 may be configured to operate with one or more components of a vehicle. According to one embodiment, vehicle system 300 includes control unit 305, object detection system 310, vehicle display unit 320, and audible output system 325.

Control unit 205 may relate to a processor or control module and may include memory (e.g., non-transitory memory) storing executable instructions to execute one or more processes described herein. Control unit 305 may include one or more software modules. Control unit 305 is includes spatial alert module 315 configured to receive and communicate data from object detection system 310 to control operation of vehicle components including vehicle display unit 320 and audible output system 325.

Object detection system 310 may include a plurality of object sensing units 311 including one or more sensors and imaging devices. In one embodiment, a combination of optical imaging devices and near field object sensors may be used to detect and classify objects relative to a vehicle. Object detection system 310 may also include a communication module having wireless network communication capabilities to receive data over a wireless communication network regarding objects relative to a vehicle based on the vehicles position and heading. Object sensing units 311 and communication module 312 may output data to control unit 305 and spatial alert module for determination of vehicle warnings and alerts.

Vehicle display unit 320 may relate to a display of a vehicle user interface. Control unit 305 may be configured to output one or more display parameters to spatial alert module for visual warnings. In certain embodiments, spatial alert module 315 may also output visual warnings to audible output system when speakers $\mathbf{330}_{1\text{-}n}$ include lighted to display elements. Vehicle display unit 320 may be used to display one on more control features of a vehicle. In certain embodiments vehicle display unit may be part of a vehicle control panel. In other embodiments, vehicle display unit 320 may be separate from the instrument panel of the vehicle.

Spatial alert modules may be configured to output audible sound to speakers $\mathbf{330}_{1\text{-}n}$ of audible output system 325. As described herein, sound may be directed to one or more speakers $\mathbf{330}_{1\text{-}n}$ to impart directionality of an object.

Figure 4:
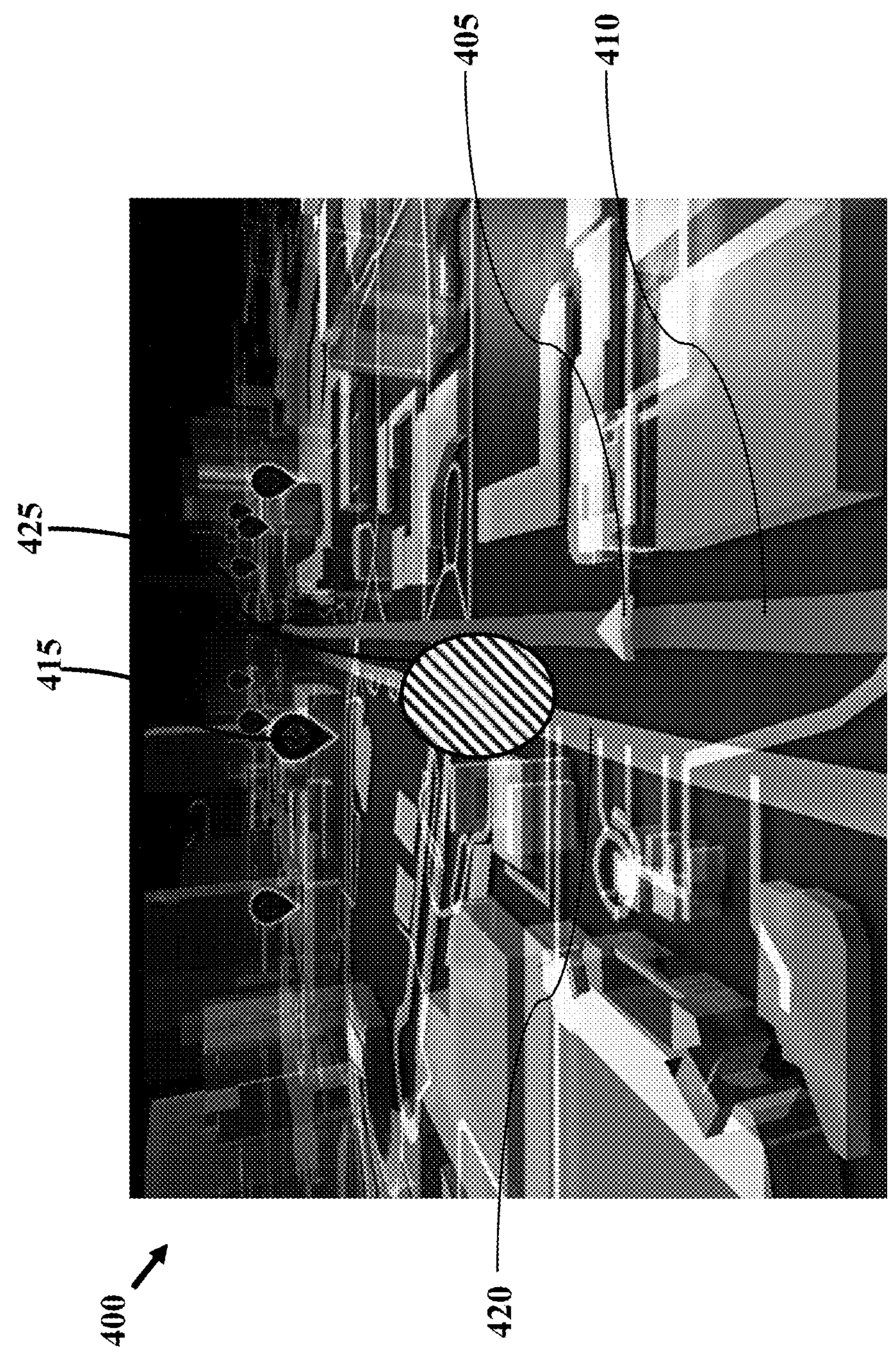
FIG. 4 depicts a graphical representation of a vehicle display according to one or more embodiments.

FIG. 4 depicts a graphical representation of a vehicle display according to one or more embodiments. According to one embodiment, visual alerts may be presented in a vehicle display. FIG. 4 depicts an exemplary display presentation 400 of a vehicle navigation system including vehicle representation 405, route indication 410, point of interest 415, and roadways 420. According to one embodiment, a combined audio and video warning may be presented to provide an alert. According to another embodiment, a visualization of a navigation system may include the addition of a particle representation to one or more display elements of display presentation 400. FIG. 4 depicts graphical element 425 representing a visual warning. According to one embodiment, graphical element 425 relates to a visual element added by control unit to display presentation 400. Display position of graphical element 425 may be presented based on the location of an object detected relative to a vehicle. According to another embodiment a control unit may control the display characteristics to control the size, and appearance of graphical element 425. In certain embodiments, objects of higher importance will be presented with increased size. Control of the display graphical element 425 may also modify the position of graphical element 425 relative to changes in the vehicle heading and position. According to another embodiment, one or more display elements or display areas may be presented with a particle display for visual output of an alert.

Figure 5A:
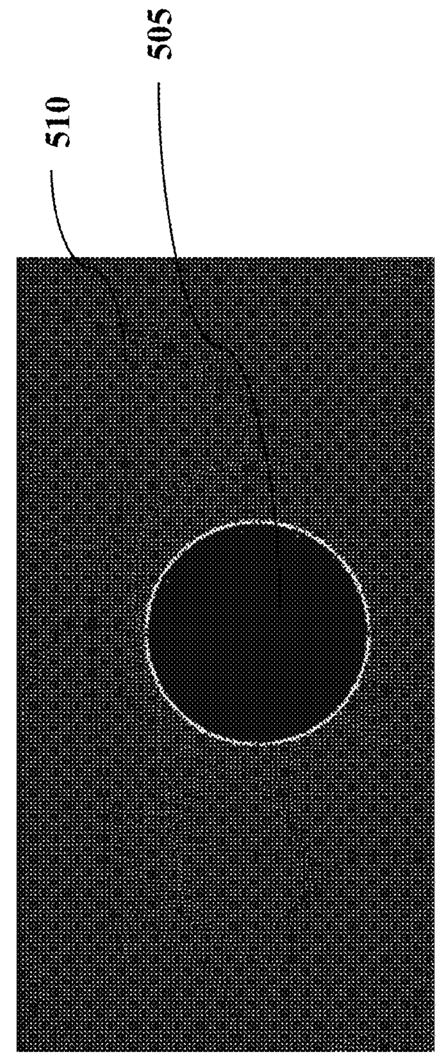
FIGS. 5A-5B depict graphical representations of exemplary particle animations according to one or more embodiments.
Figure 5B:
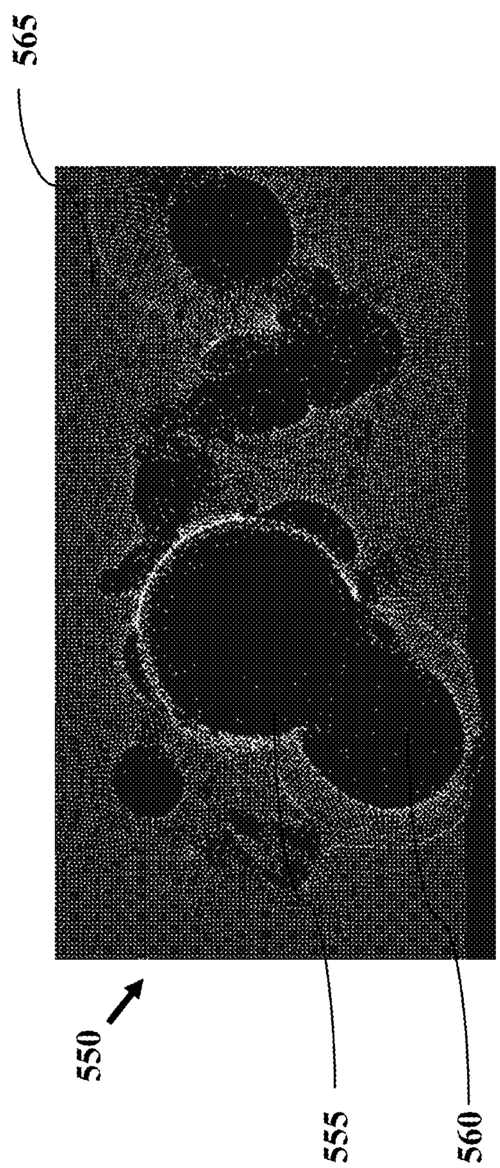

FIGS. 5A-5B depict graphical representations of exemplary particle animations according to one or more embodiments. According to one embodiment, display elements presented by a display unit of a vehicle may be controlled to present a visual alert. According to another embodiment, speaker units of a vehicle may include one or more display features such as lighted areas. FIG. 5A shows an exemplary particle animation 500 that may be presented by a vehicle display or light display element of a speaker unit. According to one embodiment, particle animation can include at least one of a focus element 505 and a background. Focus element 505 is shown as a circular element. According to one embodiment, focus elements may change positions, as directed by a controlled, to show changes in object position. Focus elements may include a particle shape that may change size. Focus elements may be presented to display or appear as impact dot elements of background 510. According to one embodiment, presentation of a focus element 505 on background 510 may indicate the location of an object. Object importance and/or distance may be reflected by one or more of the color and size of focus element 505. Backgrounds of the particle animations may relate to an area or location relative to a vehicle.

FIG. 5B illustrates an exemplary particle animation 550 that may be presented by a vehicle display or light display element of a speaker unit. According to one embodiment, particle animation 550 can include a plurality of focus elements including focus element 555 and focus element 560, and background 565. Focus element 555 is presented with increased size relative to focus element 560 to indicate importance. Each of the focus elements presented in particle animation 550 may relate to objects detected and/or determined by a vehicle control unit.

Figure 6:
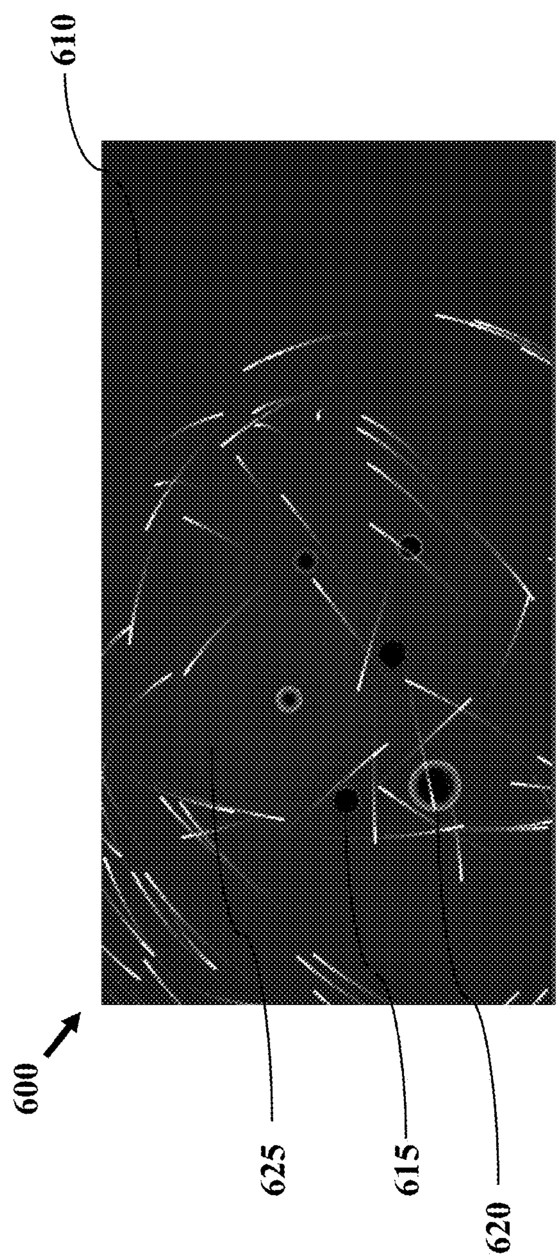
FIG. 6 depicts a graphical representation of an exemplary particle animation according to one or more embodiments.

It should be appreciated that one or more particle animations and configurations can be employed. FIG. 6 depicts a graphical representation of an exemplary particle animation according to one or more other embodiments. Particle animation 600 may be a spatial particle animation including display area 610 having a plurality of focus elements, such as focus elements 615 and 620. Display area 610 may relate to a display element of a speaker unit or a particle display area of a display unit. According to one embodiment, focus elements 6215 and 620 are presented to indicated an object location. In addition, display parameters including one or more of size, color and radiating design features may be presented based on one or more of object type, object significance and hazard level. In addition to focus points, particle animation 600 may include one or more animation streams 625 as providing background and/or an indication of change to focus points.

Figure 7A:
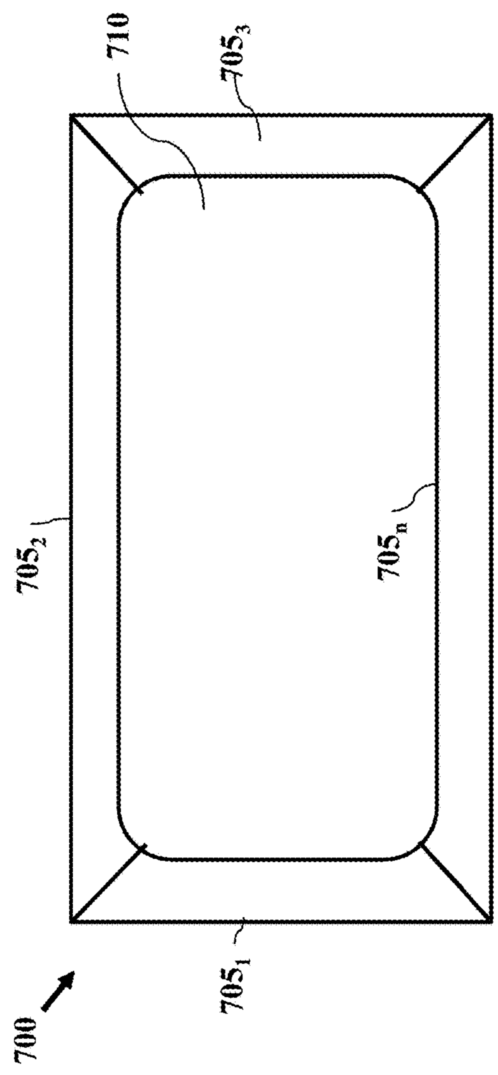
FIG. 7 depicts a graphical representation of a display configuration according to one or more embodiments.
Figure 7B:
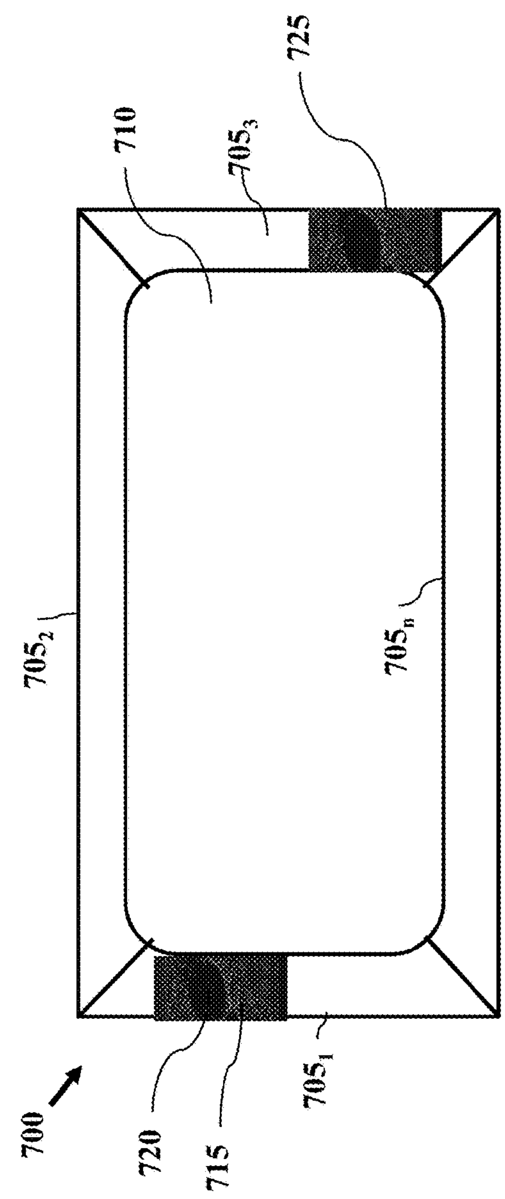

FIGS. 7A-7B depicts a graphical representation of a display configuration according to one or more embodiments. According to one embodiment, at least one or a display bezel and/or an outer portion of a display unit (e.g., display unit 105) may include particle animations. FIG. 7A shows a display 700 including a plurality of display regions $\mathbf{705}_{1\text{-}n}$ in addition to display area 710. According to one embodiment, display area 710 is configured to display one or more vehicle features including a user interface home screen, navigation application, media player etc. According to another embodiment, either portions or an entirety of display regions $\mathbf{705}_{1\text{-}n}$ may present with a particle animation.

FIG. 7B shows the inclusion of a particle animation having a particle animation 715 with focus element 720. According to one embodiment, particle animation 715 is presented in display region $\mathbf{705}_1$ to indicate an object associated in a direction corresponding to display region $\mathbf{705}_1$. For example, if display region $\mathbf{705}_1$ may relate to the left side of vehicle while display region 7053 relates to a right side. According to one embodiment, multiple display regions can include particle animations. Particle animation 725 may relate to an object detected in association with a right side of a vehicle compared to particle animation 715.

While this disclosure has been particularly shown and described with references to exemplary embodiments thereof, it will be understood by those skilled in the art that various changes in form and details may be made therein without departing from the scope of the claimed embodiments.

What is claimed is:

1. A driver alert system for combined visual and audible spatial warnings, the system comprising:

an object detection system configured to provide the location of at least one object relative to the vehicle;

an audible output system including a plurality of speaker units;

a display unit; and a control unit coupled to the object detection system, audible output system and display unit, the control unit configured to determine location of the at least one object relative to a vehicle passenger position, generate a combined visual and audible spatial warning, and control output of the combined visual and audible spatial warning, wherein the audible output system is controlled to output an audible alert indicating the location of the object relative to the vehicle passenger, and wherein the display unit is controlled to present a particle display output indicating the location of the object relative to the vehicle passenger;

wherein the visual warning is a particle animation display presented by the display unit and located on the speaker unit and the particle animation display includes a focus point presented to identify the object position and one or more particle elements determined for the object; and wherein the particle animation display includes particle animation streams indicating a change in position of the focus point and the object.

2. The system of claim 1, wherein the location of the at least one object relative to a vehicle passenger position is determined to identify angular position and distance relative to the vehicle passenger position.

3. The system of claim 1, wherein the visual warning includes at least one of a lighted display and lighted warning by a display element of a speaker unit of the audible output system.

4. The system of claim 1, wherein the audio warning includes at least one of a sound and an alert generated by a speaker unit associated with the location of the object.

5. The system of claim 1, wherein the audio warning is output by controlling operation of at least one speaker unit to direct sound output in coordination with display of the visual warning.

6. The system of claim 1, wherein the combined visual and audible spatial warning is generated based on a category of the object.

7. The system of claim 1, further comprising updating the output of the combined visual and audible spatial warning based on changes in object position.

8. The system of claim 1, further comprising updating the output of the combined visual and audible spatial warning based on changes in direction of the vehicle relative to the object.

9. A method for combined visual and audible spatial warnings by a driver alert system, the method comprising:

determining, by a control unit, location of the at least one object relative to a vehicle passenger position, generating, by the control unit, a combined visual and audible spatial warning, and controlling, by the control unit, output of the combined visual and audible spatial warning, wherein an audible output system is controlled to output an audible alert indicating the location of the object relative to the vehicle passenger, and wherein a display unit is controlled to present a particle display output indicating the location of the object relative to the vehicle passenger;

wherein the visual warning includes generating a particle animation display located on a speaker unit and including presenting a focus point to identify the object position and one or more particle elements determined for the object, and generating particle animation streams on the display unit indicating a change in position of the focus point and the object.

10. The method of claim 9, wherein the location of the at least one object relative to a vehicle passenger position is determined to identify angular position and distance relative to the vehicle passenger position.

11. The method of claim 9, wherein the visual warning includes at least one of a lighted display and lighted warning by a display element of a speaker unit of the audible output system.

12. The method of claim 9, wherein the audio warning includes at least one of a sound and an alert generated by a speaker unit associated with the location of the object.

13. The method of claim 9, wherein the audio warning is output by controlling operation of at least one speaker unit to direct sound output in coordination with display of the visual warning.

14. The method of claim 9, wherein the combined visual and audible spatial warning is generated based on a category of the object.

15. The method of claim 9, further comprising updating the output of the combined visual and audible spatial warning based on changes in object position.

16. The method of claim 9, further comprising updating the output of the combined visual and audible spatial warning based on changes in direction of the vehicle relative to the object.

* * * * *